United States Patent Office 2,947,847
Patented Aug. 2, 1960

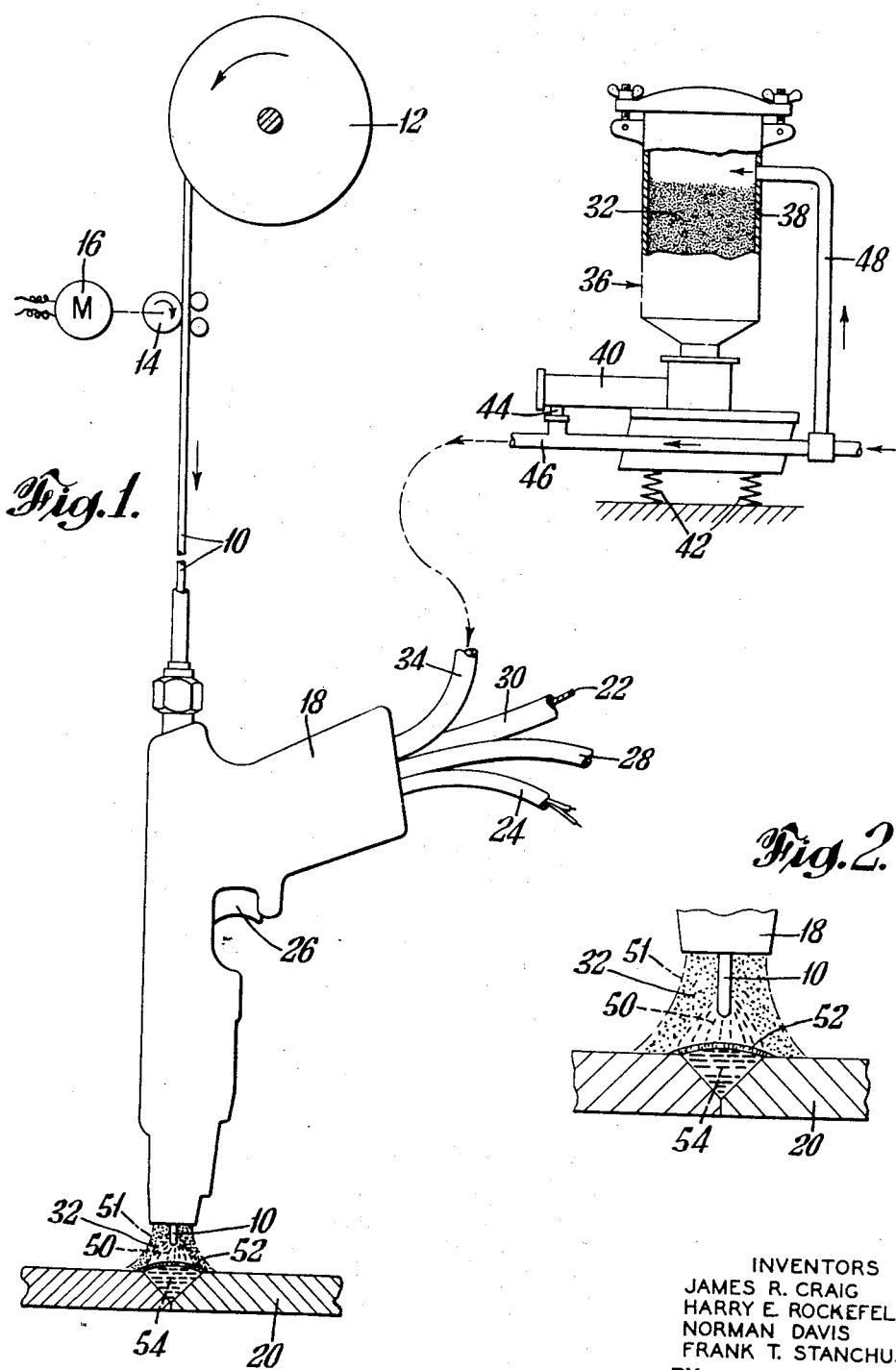

2,947,847
SHIELDED METAL ARC WELDING PROCESS

James R. Craig, Pleasantville, and Harry E. Rockefeller, Bronxville, N.Y., Frank T. Stanchus, West Orange, N.J., and Norman Davis, Los Angeles, Calif., assignors to Union Carbide Corporation, a corporation of New York Filed Jan. 14, 1955, Ser. No. 481,798
4 Claims. (Cl. 219—74)

The present invention relates to a shielded electric arc welding process and, more particularly, to such a process wherein a consumable metal electrode is employed.

Heretofore, shielded metal arc welding was first accomplished employing coated rods which were replaced as they were consumed. Such a procedure requires a periodic interruption of the welding operation to provide replacement of an electrode rod in the electrode holder and such interruptions were time-consuming and costly. It was, therefore, desired to provide a metal arc welding process wherein a rod could be continuously fed into the welding zone, and many processes were proposed for accomplishing this result.

One such process employed a continuous bare electrode which was energized and fed into the welding zone under a layer of granulated welding composition which melted and covered the end of the electrode and molten weld metal thus shielding and refining it. This process is referred to as the "submerged melt welding process" and was disclosed and claimed in U.S. Patent No. 2,043,960 to L. T. Jones et al. While this process provided resultant welds of desired physical properties and low cost (particularly for automatic welding), the lack of visibility of the weld puddle limited its use for manual applications.

A number of other processes have been proposed for continuously fed electrode welding. Some of these involved the use of flux-cored electrodes. Others involved coatings so applied as to provide means for introducing current through them to the core wire. All such processes involved a high cost of electrode and difficulty in use for satisfactory welding results.

In an attempt to provide a process which was not limited to downhand position welding and in which the arc and welding zone are visible, the gas shielded metal arc welding process was provided. This process comprised feeding a continuous bare wire electrode into the welding zone while concurrently shielding the arc zone and weld puddle with a gas which is inert to the weld puddle.

It is very difficult to employ such prior gas shielded metal arc welding processes to obtain stable welding conditions when employing a direct-current welding source at straight polarity or an alternating current welding source. The prior gas shielded metal arc welding processes are limited in their effectiveness primarily to the use of only direct current reverse polarity welding sources. It has long been known that higher metal deposition rates (pounds per hour of metal deposited) could be attained in gas shielded metal arc welding with direct current sources at straight polarity if a process could be provided for obtaining arc stability under such conditions. Further, it has long been desired, from an equipment standpoint, to obtain a gas shielded metal arc welding process which is operable with an alternating current welding source.

Another limitation in this process is that, while the arc and weld puddle were properly shielded from atmospheric contamination, the weld puddle cannot effectively be fluxed, refined or alloyed in applications where such is desired without the use of specially treated welding rods which are very costly.

Still further, it is not possible in such prior gas shielded metal arc welding processes to properly protect the deposited metal from exposure to air during final solidification and cooling; large quantities of relatively expensive gases, such as argon, are required; it is not possible to control the weld metal cooling rate and thereby decrease the degree of porosity and improve the mechanical properties; it is not possible to add special alloys other than those present in the electrode; and it is not possible, without the use of specially treated electrode rods, to employ $CO_2$ as a shielding gas without obtaining an excessive amount of spatter.

Accordingly, it is the prime object of the present invention to provide a shielded metal arc welding process wherein the beneficial arc characteristics of shielding gas are maintained and wherein the weld puddle is additionally shielded and, where desired, fluxed, refined, and alloyed.

Another object is to provide such a shielded metal arc welding process capable of efficiently depositing weld metal at a high current density and metal deposition rate to produce a weld of desired strength and low porosity at gas consumption rates appreciably lower than those required in prior gas shielded arc welding processes.

A further object is to provide a gas shielded metal arc welding process which is operable with equal effectiveness with welding current sources of both polarities of direct current and with alternating current.

A still further object is to provide a gas shielded metal arc welding process wherein relatively inexpensive gases, such as carbon dioxide, may be employed as the shielding gas and welds of high quality can be obtained with a minimum amount of spatter. Other aims and advantages of the invention will be apparent from the following description and appended claims.

In accordance with the present invention, there is provided a gas shielded metal arc welding process wherein a shielding gas carries into the welding zone a quantity of powdered granulated welding composition. A sufficient quantity of such powdered welding composition is conveyed into the weld zone by the shielding gas stream to fuse and chemically react with the molten metal of the weld puddle, thereby fluxing and refining the weld puddle, and physically shielding the weld puddle from atmospheric contamination.

In carrying out the process of the invention, powdered granulated welding composition is suspended or propelled in the shielding gas stream and conveyed in that medium into the welding zone formed between a consumable metal electrode and the workpiece. It has been found preferable for some applications to so introduce the gas-borne powdered welding composition into the welding zone that passage through the arc zone is avoided. When such is desired, the welding composition may be introduced into the welding zone in the outer portion of the shielding gas stream, i.e. away from the centrally located arc, and in that manner can be introduced into the weld puddle and at the same time carried free of the arc zone.

The powdered welding composition employed in the process of the invention can comprise any suitable granulated solid welding composition similar to the silicate-containing type used in the solid composition-shielded submerged melt welding art. Deoxidizers or other weld modifying alloying agents may be added to the welding compositions, as desired.

Welding compositions used in the solid composition-shielded arc welding art ordinarily comprise, as their principal ingredients a silicate-containing slag-producing component capable of forming a protective molten layer for shielding and shaping the weld puddle, and a metal halide component which serves to impart electrical conductivity to the slag formed from the slag-producing component of the welding composition. Some of the compounds which have been successfully employed in the slag-producing component are as follows: titanium dioxide, manganous oxide, ferrous oxide, silica (as a silicate in combination with at least one of the oxides here listed), calcium oxide, magnesium oxide, zirconia, potassium oxide, sodium oxide, lithium oxide, barium oxide and strontium oxide. Some of the halides which have been successfully employed as the conductivity-imparting component are as follows: sodium aluminum fluoride, potassium silicon fluoride, calcium fluoride and calcium titanium fluoride. It is also often desirable to include in the welding composition components which are transferred to the weld filler material during the welding operation and appear in and modify the properties of the resultant weld, for example ferromanganese, ferrosilicon, ferrochromium, calcium molybdate, carbon, or reducible chemical compounds thereof, and the like.

It is believed that the introduction of a powdered granulated welding composition into the welding zone in the gaseous shielding medium accomplishes the following primary beneficial results: stabilization of the arc to produce a more quiet arc than is obtainable with prior gas shielded metal arc welding processes; formation of a layer of slag covering the molten weld puddle which serves to decrease the surface tension of the puddle, thereby increasing the surface area of the puddle and improving the bead contour of the resultant weld and reducing undercutting; and providing a slag layer covering the weld puddle which serves to thermally insulate the puddle from the incoming relatively cool stream of shielding gas, thereby substantially decreasing the cooling rate of the weld zone.

The quantity of granulated welding composition introduced into the welding zone is not such as to interfere with the visibility of the operation.

Further, there is evidence that by introducing a powdered granulated welding composition into the welding zone, whereby a layer of slag is formed covering the pool of molten metal, the chemical reactions taking place within the pool of molten metal more closely approach equilibrium than in the prior gas shielded metal arc welding process. Further, when carbon dioxide is employed as the shielding gas, there is some dissociation due to the arc to form carbon monoxide and oxygen. The addition of a slag-forming granulated welding composition is believed to protect the molten pool from the oxygen formed in this manner.

Additionally, the layer of protective slag formed on the weld puddle by the introduction of powdered granulated welding composition into the welding zone serves to lower the cooling rate of the molten pool as well as prevent oxidation of that zone after the arc and stream of shielding gas pass on to weld on as-yet unwelded portions of the workpiece.

The particle size of the granulated welding composition employed may vary over wide ranges, the limits being determined by dimensions of powder passages of the equipment and the ability to disperse and suspend or propel the powders in a carrier gas stream.

The shielding gas medium employed in the process of the invention broadly may comprise any shielding gas used heretofore in gas shielded metal arc welding, such as argon, helium, and carbon dioxide, or mixtures thereof, with or without minor amounts of oxygen up to approximately 15%.

It has also been found that the process of the invention may be employed to produce welds which greatly differ in composition from the composition of the electrode rod employed. For example, a carbon steel rod may be employed to produce resultant welds of chromium steel, manganese steel, and the like, by adding to the granulated weld composition weld-modifying components such as chromium, manganese, nickel, and the like. In this manner, a bare carbon rod may be uniformly employed, regardless of the composition of the resultant weld desired, and weld-modifying components may be added to the welding composition to supply the necessary components desired in the resultant weld and not present in the electrode rod.

It has been found necessary, for the efficient performance of the process of the invention, to correlate the rod metal deposition rate with the powdered granulated welding composition flow rate. As the current is increased for a given welding rod at a given voltage, the metal deposition rate is proportionately increased. It has been found, that for a given shielding gas, the gas flow rate is substantially independent of metal deposition rate. However, for higher metal deposition rates, and consequently faster welding rates, the powdered granulated welding composition flow rate must also be proportionally increased. Such correlation of rod metal deposition rate and powdered granulated welding composition flow rate required for a given welding operation, within the ranges given below, is readily determinable by one skilled in the art.

It has been found that, by varying the welding current (and rod sizes) over a range of about 80 to 500 amperes (preferably currents between about 200 to 400 amperes are employed), metal deposition rates between about 4 pounds per hour and about 24 pounds per hour can be obtained with mild steel with a deposition efficiency greater than 95%. Over such range, it has been found that a shielding gas flow rate from about 10 cubic feet per hour to about 50 cubic feet per hour for argon, 95% argon-5% oxygen, and carbon dioxide is operable to shield the arc and welding zone but a range of from about 15 to 30 cubic feet per hour is preferred. When employing helium as the shielding gas, a gas flow rate of about twice these values has been found desirable. Powdered granulated welding composition flow rates have ranged between about 10–150 grams/min. depending on the welding current and other welding conditions employed. A range of welding composition-to-rod ratio, over the range of metal deposition rate stated above, was found to be from about 0.2 pound of welding composition per pound of rod for the lowest metal deposition rates, to about 1.5 pounds of welding composition per pound of rod for the highest metal deposition rates. It is, however, not possible to accurately determine a range of pounds of welding composition per pound of rod corresponding to range of rod deposition rate due to the great variations in consumption efficiency of the powdered flux for various applications. For example, consumption efficiency for downhand welding applications varied between 70% and 90%, while values of between 40% and 60% were obtained for vertical welding applications. Additionally, variations in composition of the granulated welding compositions will require changes in flow rates within the above range. Representative deposition rates, gas flow rates and powder flow rates are given below in the tables for various welding applications.

It has also been found that the powdered welding composition may be carried through the welding gun to the welding zone in a carrier gas stream of suitable flow rate, while an ancillary stream of shielding gas is employed to augment the carrier gas stream for the purpose of shielding the arc and welding zones. In this manner, the rate of introduction of welding composition into the welding zone can more easily be controlled regardless of the overall flow rate of shielding gas required to properly shield the welding zone.

Apparatus suitable for practicing the method of the invention is schematically shown in the drawing, wherein:

Fig. 1 is a schematic view of apparatus suitable for performing the process of the invention; and Fig. 2 is an enlarged view of the arc and welding zones of Fig. 1.

With reference to the drawing, a metal welding rod or wire electrode 10 is drawn from a rod reel 12 by rod feed control means 14, driven by a variable speed motor 16, and fed through a welding gun 18 toward a workpiece 20. A power cable 22 passes into gun 18 where it energizes rod 10, while a similar cable (not shown) is connected to workpiece 20 to complete the electric welding circuit. Switch cable 24 is connected through trigger 26 of welding gun 18 and controls the energization of the welding circuit. Water cooling is provided within gun 18 through inlet conduit 28 and outlet conduit 30 surrounding power cable 22. Powdered granulated material 32 is borne to welding gun 18 in the shielding gas stream through conduit 34. The power is introduced into the shielding gas through power dispenser 36 in the gas stream. Dispenser 36 comprises a closed hopper 38 into which powder 32 is stored. Shelf 40 of dispenser 36 is electrically vibrated on springs 42 and conveys powder 32 through conduit 44 to the shielding gas stream passing through conduit 46 which communicates with gas inlet conduit 34 of welding gun 18. Pressure equalization of the hopper above the powder charge 32 is accomplished through conduit 48 of dispenser 36. Such dispenser is of the type disclosed and claimed in U.S. Patent No. 2,533,331, issued on December 12, 1950, to G. M. Skinner.

As the rod 10 is struck to the workpiece 20 to initiate an arc 50 and begin the welding operation, shielding gas is discharged from the nozzle around rod 10 to form a shielding envelope 51 around arc 50. The suspended powdered granulated welding composition 32 is introduced into the zone in the shielding medium around arc 50 and forms a layer 52 of molten slag protecting the molten puddle 54.

The following tables contain data for various runs employing the process of the invention for different applications, under different operating conditions, with various shielding gas compositions and powdered granulated welding compositions. Table I sets forth data for butt welding of carbon steel; Table II for fillet welding of carbon steel; and Table III for fillet and butt welding of type 304 stainless steel.

Table I

| Run Nos. | 1 | 2 | 3 | 4 |
|---|---|---|---|---|
| Description: | | | | |
| Material | Carbon Steel. | | | |
| Joint | Butt-Double Vee ¾" Thick. | | | |
| Number Passes | 4 | 4 | 4 | 4. |
| Wire Dia | 3⁄32 | 3⁄32 | 3⁄32 | 3⁄32. |
| Wire Type | 36 | 36 | 36 | 36. |
| Shield Gas Flow | 20 | 20 | 20 | 20. |
| Shield Gas Type | 5%O$_2$-95%A | CO$_2$ | CO$_2$ | 5%O$_2$-95%A. |
| Weld Comp., Grade. | A | A | B | B. |
| Weld Comp., Size | 20 x D | 20 x D | 20 x D | 20 x D. |
| Approx. Dep. Rate, Lb. per Hr. | 11/12 | 11/12 | 11/12 | 11/12. |
| Powder Flow, Gm. per Min. | 60 | 70 | 40 | 40. |
| Lb. Powder per Lb. of Wire. | .7 | .8 | .45 | .45. |
| Welding, Current, Amperes. | 380 DCRP | | | 380 DCRP. |
| Arc Voltage, Volts | 24 | | | 24. |
| Average Welding Speed, i.p.m. | 16 | | | 16. |

Table II

[All runs single pass fillet welds in one-quarter inch thick plate, using 20 cubic feet per hour of shielding gas consisting of (1) CO$_2$ or (2) a mixture of 95% argon with 5% oxygen and a welding composition sized through 20 inch screen.]

| Run Nos. | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|
| Wire Dia | 3⁄32 | 3⁄32 | 3⁄32 | 1⁄16 | 1⁄16 | 1⁄16 | 1⁄16 | 1⁄16 | 1⁄16 | 3⁄32 | 3⁄32 | 3⁄32 | 3⁄32 | 3⁄32 | 3⁄32 |
| Wire Type | 36 | 36 | 36 | 1 | 1 | 1 | 1 | 1 | 1 | 29 | 29 | 29 | 29 | 29 | 29 |
| Shield Gas | 1 | 1 | 2 | 2 | 1 | 2 | 1 | 2 | 1 | 1 | 2 | 1 | 2 | 1 | (¹) |
| Weld Comp | A | B | B | A | A | B | B | B | B | B | B | B | B | A | B |
| Dep. Rate, Lb. Per Hr | 13.5 | 12 | 12 | 10 | 10 | 18 | 18 | 18 | 18 | 15 | 14 | 15 | 15 | 15 | 16 |
| Powder Flow, Gm. per Min | 60 | 40 | 40 | 60 | 60 | 45 | 45 | 45 | 45 | 40 | 40 | 40 | 40 | 50 | 40 |
| Lb. Powder Lb. Wire | .6 | .45 | .45 | .8 | .8 | .35 | .35 | .35 | .35 | .35 | .40 | .35 | .35 | .45 | .35 |
| Current | 420 | 380 | 400 | 325 | 300 | 360 | 340 | 350 | 350 | 350 | 350 | 350 | 350 | 350 | 350 |
| Polarity | DR | DR | DR | DR | DR | DS | DS | AC | AC | DS | DS | AC | AC | AC | AC |
| Arc Volts | 24 | 28 | 24 | 24 | 28 | 28 | 30 | | | 30 | 30 | 30 | 30 | 30 | 30 |
| Arc Speed | 16 | 16 | 16 | 12 | 12 | 15 | 15 | 14 | 14 | 16 | 16 | 16 | 16 | 16 | 16 |

¹ Shielding gas employed was Helium at 30 c.f.h. flow rate.

Table III

| Run Nos. | 20 | 21 | 22 |
|---|---|---|---|
| Description: | | | |
| Material | Stainless Steel Type 304. | | |
| Joint | Filler ¼" Plate Thickness. | | Butt. |
| Number Passes | 1 | 1 | 1. |
| Wire Dia | 1⁄16 | 1⁄16 | 1⁄16. |
| Wire Type | 61 | 61 | 61. |
| Shield Gas Flow | 15 | 15 | 10. |
| Shield Gas Type | 5%O$_2$-95%A | 5%O$_2$-95%A | 5%O$_3$-95%A. |
| Weld Comp., Grade. | A | A | A. |
| Weld Comp., Size | 20 x D | 20 x D | 20xD. |
| Approx. Dep. Rate, Lb. per Hr. | 11 | 18 | 11. |
| Powder Flow, Cm. per Min. | 40 | 40 | 40. |
| Lb. Powder per Lb. of Wire. | .5 | .3 | .5. |
| Welding Current, Amperes. | 300 DCRP | 350 DCSP | 300 DCRP. |
| Arc Voltage, Volts | 25 | 27 | 25. |
| Average Welding Speed, i.p.m. | 14 | 18 | 14. |

The average compositions, by proximate analysis, of Grade A and Grade B welding compositions employed in the runs set forth in the tables above are as follows:

Grade A:
CaO+BaO _____ 22.5%.
CaF$_2$ _____ 5.5%.
SiO$_2$ _____ 37.5%.
Al$_2$O$_3$ _____ 14.5%.
MgO _____ 11.25%.
MnO _____ 7.25%.
where:
BaO _____ 2.0% max.

Grade B:
CaO+BaO _____ 5%.
CaF$_2$ _____ 5.25%.
SiO$_2$ _____ 39%.
Al$_2$O$_3$ _____ 3%.
MgO _____ 1.5% max.
MnO _____ 41%.
MnO$_2$ _____ 1% max.
Fe$_2$O$_3$ _____ 2%.
where:
BaO _____ 2.0% max.

What is claimed is:

1. The process of electric arc welding steel wherein a metal electrode and a metal workpiece are connected to a source of welding current comprising, feeding said electrode toward said workpiece to establish and maintain an arc and welding zone between said electrode and said workpiece; suspending in at least a part of a stream of shielding gas, at a point remote from said arc about 10 to about 150 grams per minute of solid non-magnetic granulated welding composition composed of a fused and crushed silicate selected from the class consisting of manganese, magnesium, calcium and aluminum and having a slag-producing component capable of fusion in the arc to produce a slag, and a metal halide electrical conductivity-imparting component; feeding said gas and solid stream independently of the electrode around said arc and welding zone at a rate between about 10 and about 50 cubic feet per hour to shield said arc and said welding zone, to stabilize said arc, and to flux and refine said welding zone; and coordinating the rate of suspending said welding composition in said gas stream with the rate of fusion of said electrode between about 0.2 pound of composition per pound of rod to about 1.5 pounds of composition per pound of rod to form a slag blanket on the weld produced by said arc.

2. The process of electric arc welding as defined by claim 1, in which the welding composition is composed of:

| | |
|---|---|
| $CaO+BaO$ | 22.5%. |
| $CaF_2$ | 5.5%. |
| $SiO_2$ | 37.5%. |
| $Al_2O_3$ | 14.5%. |
| $MgO$ | 11.25%. |
| $MnO$ | 7.25%. |
| where: | |
| $BaO$ | 2.0% max. |

3. The process of electric arc welding as defined in claim 1, in which the welding composition is composed of:

| | |
|---|---|
| $CaO+BaO$ | 5%. |
| $CaF_2$ | 5.25%. |
| $SiO_2$ | 39%. |
| $Al_2O_3$ | 3%. |
| $MgO$ | 1.5% max. |
| $MnO$ | 41%. |
| $MnO_2$ | 1% max. |
| $Fe_2O_3$ | 2%. |
| where: | |
| $BaO$ | 2.0% max. |

4. The process of electric arc welding steel wherein a metal electrode and a metal workpiece are connected to a source of welding arc current sufficient to melt the end of said electrode upon contact with said workpiece, comprising feeding said electrode toward said workpiece to establish and maintain the transfer of metal between such end of said electrode and said workpiece, resulting in a welding zone including the end of such electrode and a weld puddle; propelling in at least a part of a stream of shielding gas, at a point remote from said welding zone about 10 to about 150 grams per minute of solid non-magnetic welding composition in the form of powder composed of a silicate selected from the class consisting of manganese, magnesium, calcium and aluminum and having a slag-producing component capable of fusion in the welding zone to produce a slag, and a metal halide electrical conductivity-imparting component selected from the class consisting of sodium aluminum fluoride, potassium silicon fluoride, calcium fluoride and calcium titanium fluoride; feeding said stream of gas-borne solids closely adjacent the end of the electrode into said welding zone at a rate between about 10 and about 60 cubic feet per hour to shield said welding zone, to stabilize said metal transfer, and to flux and refine such weld puddle; and coordinating the rate of propulsion of said welding composition in said gas stream with the rate of deposition of said electrode between about 0.2 pound of composition per pound of rod to about 1.5 pounds of composition per pound of rod to form a slag blanket on the resulting weld.

References Cited in the file of this patent

UNITED STATES PATENTS

| | | |
|---|---|---|
| 1,589,017 | Lincoln | June 15, 1926 |
| 2,003,167 | Alexander | May 28, 1935 |
| 2,043,960 | Jones et al. | June 9, 1936 |
| 2,308,194 | Miller | Jan. 12, 1943 |
| 2,326,865 | Kennedy | Aug. 17, 1943 |
| 2,544,711 | Mikhalapov | Mar. 13, 1951 |
| 2,727,125 | Muller | Dec. 13, 1955 |
| 2,851,581 | Libby | Sept. 9, 1958 |

FOREIGN PATENTS

| | | |
|---|---|---|
| 143,331 | Great Britain | May 27, 1920 |
| 325,132 | Great Britain | Feb. 3, 1930 |
| 495,299 | Great Britain | Nov. 10, 1938 |
| 546,961 | Great Britain | Aug. 7, 1942 |
| 608,270 | Great Britain | Sept. 13, 1948 |